(12) United States Patent
Olsen et al.

(10) Patent No.: US 8,547,476 B2
(45) Date of Patent: Oct. 1, 2013

(54) IMAGE SENSOR INCLUDING REAL-TIME AUTOMATIC EXPOSURE CONTROL AND SWALLOWABLE PILL INCLUDING THE SAME

(75) Inventors: Alf Olsen, Oslo (NO); Espen A. Olsen, Tustin, CA (US); Jorgen Moholt, Moss (NO); Steinar Iversen, Barum (NO); Dov Avni, Haifa (IL); Arkady Glukhovsky, Santa Clarita, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/403,599

(22) Filed: Feb. 23, 2012

(65) Prior Publication Data
US 2012/0154563 A1    Jun. 21, 2012

Related U.S. Application Data

(60) Division of application No. 12/560,135, filed on Sep. 15, 2009, now Pat. No. 8,149,326, which is a continuation of application No. 10/846,513, filed on May 17, 2004, now Pat. No. 7,605,852.

(51) Int. Cl.
   *H04N 3/14* (2006.01)
   *H04N 5/335* (2011.01)
(52) U.S. Cl.
   USPC .................. 348/362; 348/229.1; 348/297
(58) Field of Classification Search
   None
   See application file for complete search history.

(56) References Cited

U.S. PATENT DOCUMENTS

| | | |
|---|---|---|
| 2,240,312 A | 2/1940 | Mintum |
| 3,683,389 A | 8/1972 | Hollis |
| 3,723,644 A | 3/1973 | Haskell et al. |
| 3,971,362 A | 7/1976 | Pope et al. |
| 3,984,628 A | 10/1976 | Sharp |
| 4,273,431 A | 6/1981 | Farmer et al. |
| 4,278,077 A | 7/1981 | Mizumoto |
| 4,310,228 A | 1/1982 | Treada et al. |
| 4,428,005 A | 1/1984 | Kubo |
| 4,471,228 A | 9/1984 | Nishizawa |

(Continued)

FOREIGN PATENT DOCUMENTS

| | | |
|---|---|---|
| DE | 34 40 177 | 5/1986 |
| GB | 2 374 149 | 10/2002 |

(Continued)

OTHER PUBLICATIONS

Swain, P; Iddan, G; Meron, G; Glukhovsky, A; *Wireless Capsule Encoscopy of the Small-Bowel. Development, Testing and First Human Trials*. Proc. SPIE vol. 4158, pp. 19-23, Biomonitoring and Endoscopy Technologies (2001).

(Continued)

*Primary Examiner* — Justin P Misleh
(74) *Attorney, Agent, or Firm* — Dickstein Shapiro LLP

(57) ABSTRACT

An imager and a method for real-time, non-destructive monitoring of light incident on imager pixels during their exposure to light. Real-time or present pixel signals, which are indicative of present illumination on the pixels, are compared to a reference signal during the exposure. Adjustments, if necessary, are made to programmable parameters such as gain and/or exposure time to automatically control the imager's exposure to the light. In a preferred exemplary embodiment, only a selected number of pixels are monitored for exposure control as opposed to monitoring the entire pixel array.

12 Claims, 7 Drawing Sheets

(56) References Cited

U.S. PATENT DOCUMENTS

| | | | |
|---|---|---|---|
| 4,532,918 | A | 8/1985 | Wheeler |
| 4,539,603 | A | 9/1985 | Takeuchi et al. |
| 4,631,582 | A | 12/1986 | Nagasaki et al. |
| 4,646,724 | A | 3/1987 | Sato et al. |
| 4,689,621 | A | 8/1987 | Kleinberg |
| 4,741,327 | A | 5/1988 | Yabe |
| 4,786,982 | A | 11/1988 | Wakahara et al. |
| 4,841,291 | A | 6/1989 | Swix et al. |
| 4,844,076 | A | 7/1989 | Lesho et al. |
| 4,854,328 | A | 8/1989 | Pollack |
| 4,868,645 | A | 9/1989 | Kobayashi |
| 5,187,572 | A | 2/1993 | Nakamura et al. |
| 5,202,961 | A | 4/1993 | Mills et al. |
| 5,279,607 | A | 1/1994 | Schentag et al. |
| 5,351,161 | A | 9/1994 | MacKay et al. |
| 5,355,450 | A | 10/1994 | Garmon et al. |
| 5,374,953 | A | 12/1994 | Sasaki et al. |
| 5,408,263 | A | 4/1995 | Kikuchi et al. |
| 5,423,312 | A | 6/1995 | Siegmund et al. |
| 5,486,861 | A | 1/1996 | Miyamoto et al. |
| 5,519,828 | A | 5/1996 | Rayner |
| 5,572,252 | A | 11/1996 | Naka et al. |
| 5,585,840 | A | 12/1996 | Watanabe et al. |
| 5,596,366 | A | 1/1997 | Takashima et al. |
| 5,604,531 | A | 2/1997 | Iddan et al. |
| 5,643,175 | A | 7/1997 | Adair |
| 5,678,568 | A | 10/1997 | Uchikubo et al. |
| 5,730,702 | A | 3/1998 | Tanaka et al. |
| 5,738,110 | A | 4/1998 | Beal et al. |
| 5,749,830 | A | 5/1998 | Kaneko et al. |
| 5,809,161 | A | 9/1998 | Auty et al. |
| 5,819,736 | A | 10/1998 | Avny et al. |
| 5,833,603 | A | 11/1998 | Kovacs et al. |
| 5,853,005 | A | 12/1998 | Scanlon |
| 5,873,830 | A | 2/1999 | Hossack et al. |
| 5,875,280 | A | 2/1999 | Takaiwa et al. |
| 6,053,873 | A | 4/2000 | Govari et al. |
| 6,074,349 | A | 6/2000 | Crowley |
| 6,140,630 | A | 10/2000 | Rhodes |
| 6,165,128 | A | 12/2000 | Cespedes et al. |
| 6,181,830 | B1 | 1/2001 | Sato |
| 6,204,524 | B1 | 3/2001 | Rhodes |
| 6,219,091 | B1 | 4/2001 | Yamanaka et al. |
| 6,240,312 | B1 | 5/2001 | Alfano et al. |
| 6,254,531 | B1 | 7/2001 | Higuchi et al. |
| 6,310,366 | B1 | 10/2001 | Rhodes et al. |
| 6,310,642 | B1 | 10/2001 | Adair et al. |
| 6,326,652 | B1 | 12/2001 | Rhodes |
| 6,328,212 | B1 | 12/2001 | Metlitasky et al. |
| 6,333,205 | B1 | 12/2001 | Rhodes |
| 6,351,606 | B1 | 2/2002 | Yamazaki |
| 6,364,829 | B1 | 4/2002 | Fulghum |
| 6,376,868 | B1 | 4/2002 | Rhodes |
| 6,402,689 | B1 | 6/2002 | Scarantino et al. |
| 6,428,469 | B1 | 8/2002 | Iddan et al. |
| 6,462,770 | B1 | 10/2002 | Cline et al. |
| 6,584,348 | B2 | 6/2003 | Glukhovsky |
| 6,607,301 | B1 | 8/2003 | Glukhovsky et al. |
| 6,635,834 | B1 | 10/2003 | Wenner |
| 6,636,263 | B2 | 10/2003 | Oda |
| 6,667,765 | B1 | 12/2003 | Tanaka |
| 6,690,412 | B1 | 2/2004 | Higo |
| 6,709,387 | B1 | 3/2004 | Glukhovsky et al. |
| 6,764,440 | B2 | 7/2004 | Iddan et al. |
| 6,831,689 | B2 | 12/2004 | Yadid-Pecht |
| 6,865,718 | B2 | 3/2005 | Montalcini |
| 6,900,790 | B1 | 5/2005 | Doi et al. |
| 6,934,573 | B1 | 8/2005 | Glukhovsky et al. |
| 6,939,292 | B2 | 9/2005 | Mizuno et al. |
| 6,947,788 | B2 | 9/2005 | Gilboa et al. |
| 6,984,205 | B2 | 1/2006 | Gazdzinski |
| 7,009,634 | B2 | 3/2006 | Iddan et al. |
| 7,022,067 | B2 | 4/2006 | Glukhovsky et al. |
| 7,053,954 | B1 | 5/2006 | Canini |
| 7,099,056 | B1 * | 8/2006 | Kindt ............... 358/509 |
| 7,104,952 | B2 | 9/2006 | Iddan et al. |
| 7,112,752 | B1 | 9/2006 | Wenner |
| 7,118,529 | B2 | 10/2006 | Glukhovsky et al. |
| 7,214,182 | B2 | 5/2007 | Shimizu et al. |
| 7,228,166 | B1 | 6/2007 | Kawasaki et al. |
| 7,245,320 | B2 | 7/2007 | Kaplinsky et al. |
| 7,295,226 | B1 | 11/2007 | Meron et al. |
| 7,316,647 | B2 | 1/2008 | Kimoto et al. |
| 7,355,625 | B1 | 4/2008 | Mochida et al. |
| 7,419,468 | B2 | 9/2008 | Shimizu et al. |
| 7,511,133 | B2 | 3/2009 | Baraldi et al. |
| 7,511,733 | B2 | 3/2009 | Takizawa |
| 2001/0017649 | A1 | 8/2001 | Yaron |
| 2001/0019364 | A1 | 9/2001 | Kawahara |
| 2001/0051766 | A1 | 12/2001 | Gazdzinski |
| 2002/0015101 | A1 * | 2/2002 | Mead et al. .......... 348/333.01 |
| 2002/0042562 | A1 | 4/2002 | Meron et al. |
| 2002/0093484 | A1 | 7/2002 | Skala et al. |
| 2002/0103425 | A1 | 8/2002 | Mault |
| 2002/0132226 | A1 | 9/2002 | Nair et al. |
| 2002/0158976 | A1 | 10/2002 | Vni et al. |
| 2002/0171669 | A1 | 11/2002 | Meron et al. |
| 2002/0198439 | A1 | 12/2002 | Mizuno |
| 2003/0040685 | A1 | 2/2003 | Lewkowicz et al. |
| 2003/0043263 | A1 | 3/2003 | Glukhovsky et al. |
| 2003/0077223 | A1 | 4/2003 | Glukhovsky et al. |
| 2003/0098914 | A1 * | 5/2003 | Easwar .................. 348/229.1 |
| 2003/0114742 | A1 | 6/2003 | Lewkowicz et al. |
| 2003/0117491 | A1 | 6/2003 | Avni et al. |
| 2003/0174208 | A1 | 9/2003 | Glukhovsky et al. |
| 2003/0195415 | A1 | 10/2003 | Iddan |
| 2003/0197795 | A1 | 10/2003 | Schinner |
| 2003/0210334 | A1 | 11/2003 | Sarwari |
| 2003/0210439 | A1 | 11/2003 | Sarwari |
| 2003/0211405 | A1 | 11/2003 | Venkataraman |
| 2004/0073087 | A1 | 4/2004 | Glukhovsky et al. |
| 2004/0087832 | A1 | 5/2004 | Glukhovsky et al. |
| 2004/0115877 | A1 | 6/2004 | Iddan et al. |
| 2004/0180391 | A1 | 9/2004 | Gratzi et al. |
| 2004/0210105 | A1 | 10/2004 | Hale et al. |
| 2004/0254455 | A1 | 12/2004 | Iddan |
| 2005/0110881 | A1 | 5/2005 | Glukhovsky et al. |
| 2005/0148816 | A1 | 7/2005 | Glukhovsky et al. |
| 2005/0171418 | A1 | 8/2005 | Lin |
| 2005/0183733 | A1 | 8/2005 | Kawano et al. |
| 2005/0288594 | A1 | 12/2005 | Lewkowicz et al. |
| 2006/0082648 | A1 | 4/2006 | Iddan et al. |
| 2006/0155174 | A1 | 7/2006 | Glukhovsky et al. |
| 2006/0158512 | A1 | 7/2006 | Iddan et al. |
| 2006/0164511 | A1 | 7/2006 | Krupnik |
| 2006/0184039 | A1 | 8/2006 | Avni et al. |
| 2006/0217593 | A1 | 9/2006 | Gilad et al. |
| 2007/0106111 | A1 | 5/2007 | Horn et al. |
| 2007/0225560 | A1 | 9/2007 | Avni et al. |
| 2008/0103363 | A1 | 5/2008 | Levy et al. |
| 2008/0269664 | A1 | 10/2008 | Trovato et al. |
| 2010/0110168 | A1 | 5/2010 | Avni et al. |

FOREIGN PATENT DOCUMENTS

| | | |
|---|---|---|
| JP | 47-004376 | 2/1972 |
| JP | 47-041473 | 12/1972 |
| JP | 55-121779 | 9/1980 |
| JP | 57-45833 | 3/1982 |
| JP | 64-086933 | 3/1989 |
| JP | H03-289779 | 12/1991 |
| JP | 41-09927 | 4/1992 |
| JP | H04-109927 | 4/1992 |
| JP | H04-180736 | 6/1992 |
| JP | 50-15515 | 1/1993 |
| JP | 07-275200 | 10/1995 |
| JP | 08-313823 | 11/1996 |
| JP | H10-112118 | 4/1998 |
| JP | 11-111795 | 4/1999 |
| JP | 11-290269 | 10/1999 |
| JP | 11-305144 | 11/1999 |
| JP | 2001-025004 | 1/2001 |
| JP | 2001-112740 | 4/2001 |
| JP | 2001-203910 | 7/2001 |
| JP | 2001-224553 | 8/2001 |

| | | |
|---|---|---|
| JP | 2003-093328 | 4/2003 |
| JP | 2005-156215 | 6/2005 |
| JP | 2005-156216 | 6/2005 |
| WO | WO 92/21307 | 12/1992 |
| WO | WO 98/011816 | 3/1998 |
| WO | WO 99/30610 | 6/1999 |
| WO | WO 00/74391 | 12/2000 |
| WO | WO 00/76391 | 12/2000 |
| WO | WO 01/08548 | 2/2001 |
| WO | WO 01/35813 | 5/2001 |
| WO | WO 01/50941 | 7/2001 |
| WO | WO 01/65995 | 9/2001 |
| WO | WO 01/87377 | 11/2001 |
| WO | WO 02/073507 | 9/2002 |
| WO | WO 02/080376 | 10/2002 |
| WO | WO 02/082979 | 10/2002 |
| WO | WO 02/095351 | 11/2002 |
| WO | WO 02/102224 | 12/2002 |
| WO | WO 03/009739 | 2/2003 |
| WO | WO 03/011103 | 2/2003 |
| WO | WO 03/094723 | 11/2003 |
| WO | WO 2004/004540 | 1/2004 |
| WO | WO 2004/045395 | 6/2004 |
| WO | WO 2004/082472 | 9/2004 |
| WO | WO 2004/082472 A1 | 9/2004 |

OTHER PUBLICATIONS

Bo-Rong Lin et al., "A High Dynamic Range CMOS Image Sensor Design Based on Two-Frame Composition", Electrical Engineering Department, National Tsing-Hua University.

Orly Yadid-Pect, et al., "Wide Intrascene Dynamic Range CMOS APS Using Dual Sampling", IEEE Transactions on Electron Devices, vol. 33, No. 10, Oct. 1997.

David Stoppa et al., "Novel CMOS Image Sensor With a 132-dB Dynamic Range", IEEE Journal of Solid-State Circuits, vol. 37, No. 12, Dec. 2002.

* cited by examiner

IMAGE SENSOR INCLUDING REAL-TIME AUTOMATIC EXPOSURE CONTROL AND SWALLOWABLE PILL INCLUDING THE SAME

CROSS-REFERENCE TO RELATED APPLICATIONS

This application is a divisional of U.S. patent application No. 12/560,135, filed on Sep. 15, 2009, now U.S. Pat. No. 8,149,326, which is a continuation of U.S. patent application Ser. No. 10/846,513, filed May 17, 2004, now U.S. Pat. No. 7,605,852, the subject matter of which are incorporated in their entirety by reference herein.

FIELD OF THE INVENTION

The invention relates generally to imaging devices and more particularly to real-time exposure control for automatic light control in an imaging device.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state; (4) selection of a pixel for readout; and (5) output and amplification of a signal representing pixel charge. The charge at the storage region is typically converted to a pixel output voltage by the capacitance of the storage region and a source follower output transistor.

CMOS imagers of the type discussed above are generally known as discussed, for example, in U.S. Pat. Nos. 6,140,630, 6,376,868, 6,310,366, 6,326,652, 6,204,524 and U.S. Pat. No. 6,333,205, assigned to Micron Technology, Inc., which are hereby incorporated by reference in their entirety.

FIG. 1 illustrates a block diagram for a CMOS imager 10. The imager 10 includes a pixel array 20. The pixel array 20 comprises a plurality of pixels arranged in a predetermined number of columns and rows. The pixels of each row in array 20 are all turned on at the same time by a row select line and the pixels of each column are selectively output by a column select line. A plurality of row and column lines are provided for the entire array 20.

The row lines are selectively activated by the row driver 32 in response to row address decoder 30 and the column select lines are selectively activated by the column driver 36 in response to column address decoder 34. Thus, a row and column address is provided for each pixel. The CMOS imager 10 is operated by the control circuit 42, which controls address decoders 30, 34 for selecting the appropriate row and column lines for pixel readout, and row and column driver circuitry 32, 36, which apply driving voltage to the drive transistors of the selected row and column lines.

Each column contains sampling capacitors and switches 38 associated with the column driver 36 reads a pixel reset signal $V_{rst}$ and a pixel image signal $V_{sig}$ for selected pixels. A differential signal ($V_{rst}-V_{sig}$) is produced by differential amplifier 40 for each pixel and is digitized by analog-to-digital converter 45 (ADC). The analog-to-digital converter 45 supplies the digitized pixel signals to an image processor 50, which forms a digital image output.

Lighting can effect image exposure. Light conditions may change spatially and over time. Thus, automatic light control is required to ensure that the best image is obtained by controlling the image sensor's exposure to the light. In some imager applications, there is a need to use the illumination during the actual exposure of an image (i.e., "present illumination") to control the exposure (i.e., perform exposure control). That is, there is a need to use present illumination because the use of the previous picture's illumination may not be sufficient for the intended application.

One exemplary application that would benefit from using present illumination in exposure control is the imager in a swallowable pill application, such as the one described in U.S. application Ser. No. 10/143,578, now U.S. Pat. No. 7,187,049 issued Mar. 6, 2007, the disclosure of which is incorporated herein by reference. Due to the nature of the imager in a pill application, automatic light control using present illumination is required. A proposed solution would be to light the application's light source (e.g., light emitting diodes) prior to the actual exposure periods. This technique, however, creates an undesirable high waste of energy and power by having the light source on longer than the exposure period.

Accordingly, there is a desire and need for automatic light control during an exposure period that uses present illumination, yet does not unnecessarily waste energy or power in the process.

SUMMARY

The invention provides automatic light control during an exposure period using present illumination.

Various exemplary embodiments of the invention provide an imager and a method for real-time, non-destructive monitoring of light incident on imager pixels during their exposure to light. Real-time or present pixel signals, which are indicative of present illumination on the pixels, are compared to a reference signal during the exposure. Adjustments, if necessary, are made to programmable parameters such as gain and/or exposure time to automatically control the imager's exposure to the light. In a preferred exemplary embodiment, only a selected number of pixels are monitored for exposure control as opposed to monitoring the entire pixel array.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 2:
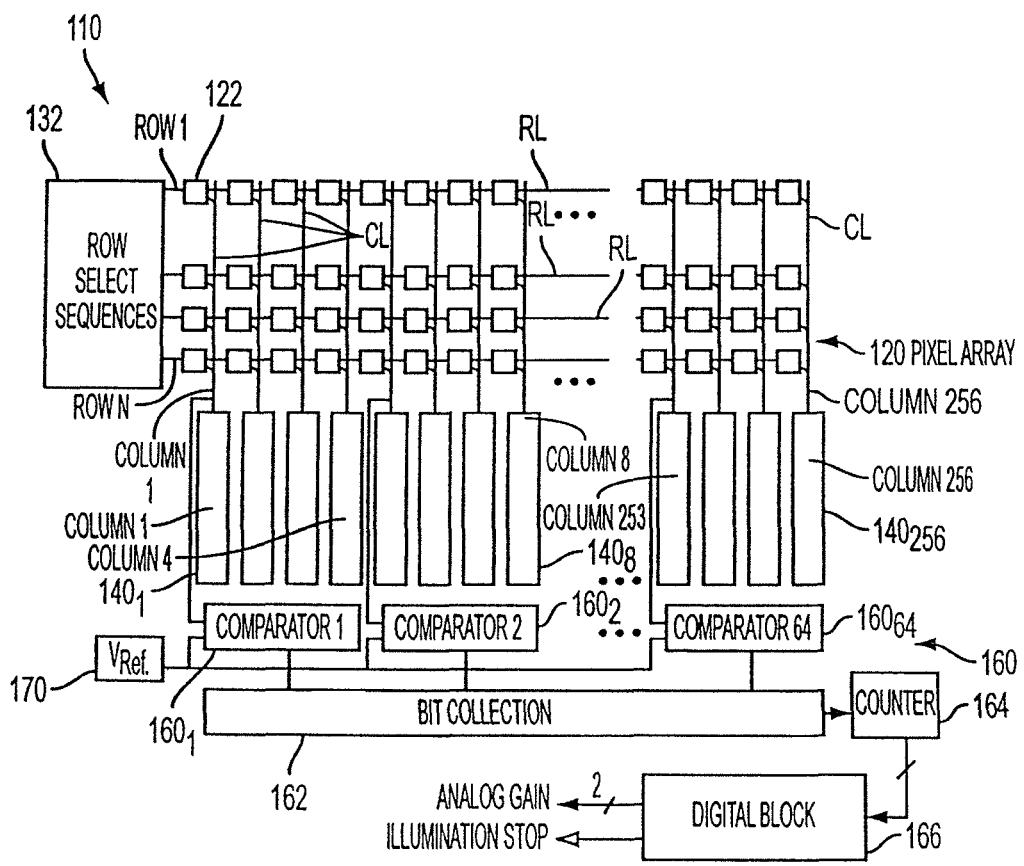
FIG. 2 illustrates a block diagram of an exemplary imager light control function constructed in accordance with an embodiment of the invention.

Referring to the figures, where like reference numbers designate like elements, FIG. 2 shows a portion of an exemplary imager 110 containing a light control function constructed in accordance with an embodiment of the invention. The imager 110 includes a pixel array 120 containing a plurality of pixels 122 organized in rows $ROW_1, \ldots, ROW_N$ and columns $COLUMN_1, \ldots, COLUMN_{256}$. A plurality of row lines RL and column lines CL are provided for the entire array 20. Pixels 122 in a same row e.g., $ROW_1$ are connected to row selection circuitry 132 by respective row lines RL. Pixels 122 in a same column $COLUMN_1, \ldots, COLUMN_{256}$ are connected by a respective column line CL to a dedicated sampling capacitors and switches $140_1, \ldots, 140_{256}$ (collectively "sampling capacitors and switches 140") for that column $COLUMN_1, \ldots, COLUMN_{256}$.

The imager 110 also includes a plurality of comparators $160_1, \ldots, 160_{64}$ (collectively "comparators 160"). In the illustrated embodiment, there are sixty-four comparators 160, one for every four columns of the pixel array 120. As is discussed below in more detail, the invention is not limited to a specific number of comparators 160. For the illustrated embodiment, the inventors have determined that sixty-four comparators 160, connected to sixty-four different columns is desirable. In the illustrated embodiment, the first comparator $160_1$ is connected to the column line CL of the first column $COLUMN_1$, the second comparator $160_2$ is connected to the column line CL of the fifth column, etc. The last comparator $160_{64}$ is connected to the column line CL of the 253rd column $COLUMN_{253}$.

In operation, the rows are selected in sequence. A "scan" as used herein is a sequence of consecutive row selections. When a predefined row e.g., $ROM_1$ in the array 120 is selected, the comparators 160 are connected to the set of pixels 122 in the dedicated columns e.g., $COLUMN_1$, $COLUMN_5, \ldots, COLUMN_{253}$. The comparators 160 receive pixel signals from their respective column lines CL. The pixel signals, as is discussed below in more detail, are used to determine the present illumination of the pixels 122 of the respective columns.

The comparators 160 are also connected to a voltage reference generator 170 that outputs a reference voltage $V_{ref}$ to be compared against the pixels signals. As is discussed below, the voltage reference generator 170 is controllable to output different reference voltages $V_{ref}$ when desired. Each comparator 160 outputs one logic value (e.g., logical "1") when its respective pixel signal exceeds the reference voltage $V_{ref}$ and a second different logical value (e.g., logical "0") when its respective pixel signal has not exceeded the reference voltages $V_{ref}$.

A bit collection circuit 162 is used to collect the results of the comparators 160 and to output the results to a counter 164. The counter 164 counts the number of pixels that have exceeded the reference voltage $V_{ref}$ in a single scan (e.g., the predetermined number of consecutively selected rows). The output of the counter 164 is used by a digital logic block 166 and compared to a predetermined number of pixels in the block 166. Depending upon the comparison, as is explained below in more detail with respect to FIG. 3, the digital block 166 may output an analog gain value ANALOG GAIN and/or an illumination stop signal ILLUMINATION STOP. The analog gain value ANALOG GAIN is used during pixel readout to ensure that the appropriate signal strength is used during the readout process. The illumination stop signal ILLUMINATION STOP is used to end the exposure period for all of the pixels 122 in the array 120 (i.e., stop the exposure of light onto the pixels 122).

Figure 1:
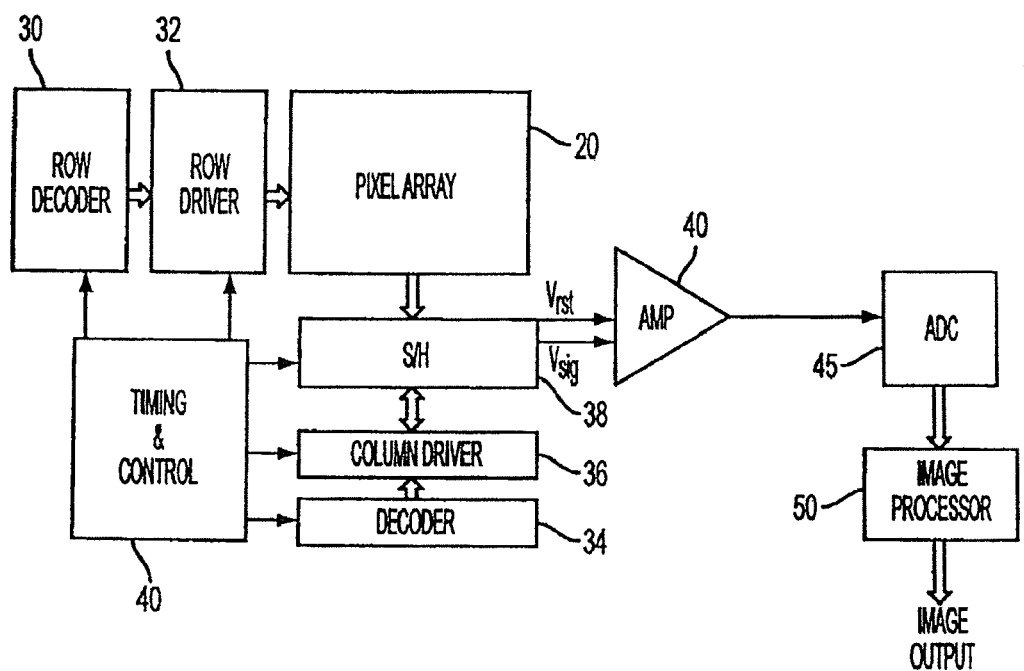
FIG. 1 illustrates a block diagram for a CMOS imager.

Although not shown, the imager 110 also includes a differential amplifier (e.g., amplifier 40 of FIG. 1), an analog-to-digital converter (e.g., ADC 45 of FIG. 1) and an image processor (e.g., processor 50 of FIG. 1). As described above with reference to FIG. 1, the sample and hold circuit samples and holds pixel reset $V_{rst}$ and a pixel image signals $V_{sig}$ for selected pixels. The differential amplifier produces a differential signal ($V_{rst}$-$V_{sig}$) for each pixel, which is digitized by the analog-to-digital converter The digitized pixel signals are input by the image processor and output as a digital image.

Figure 3:
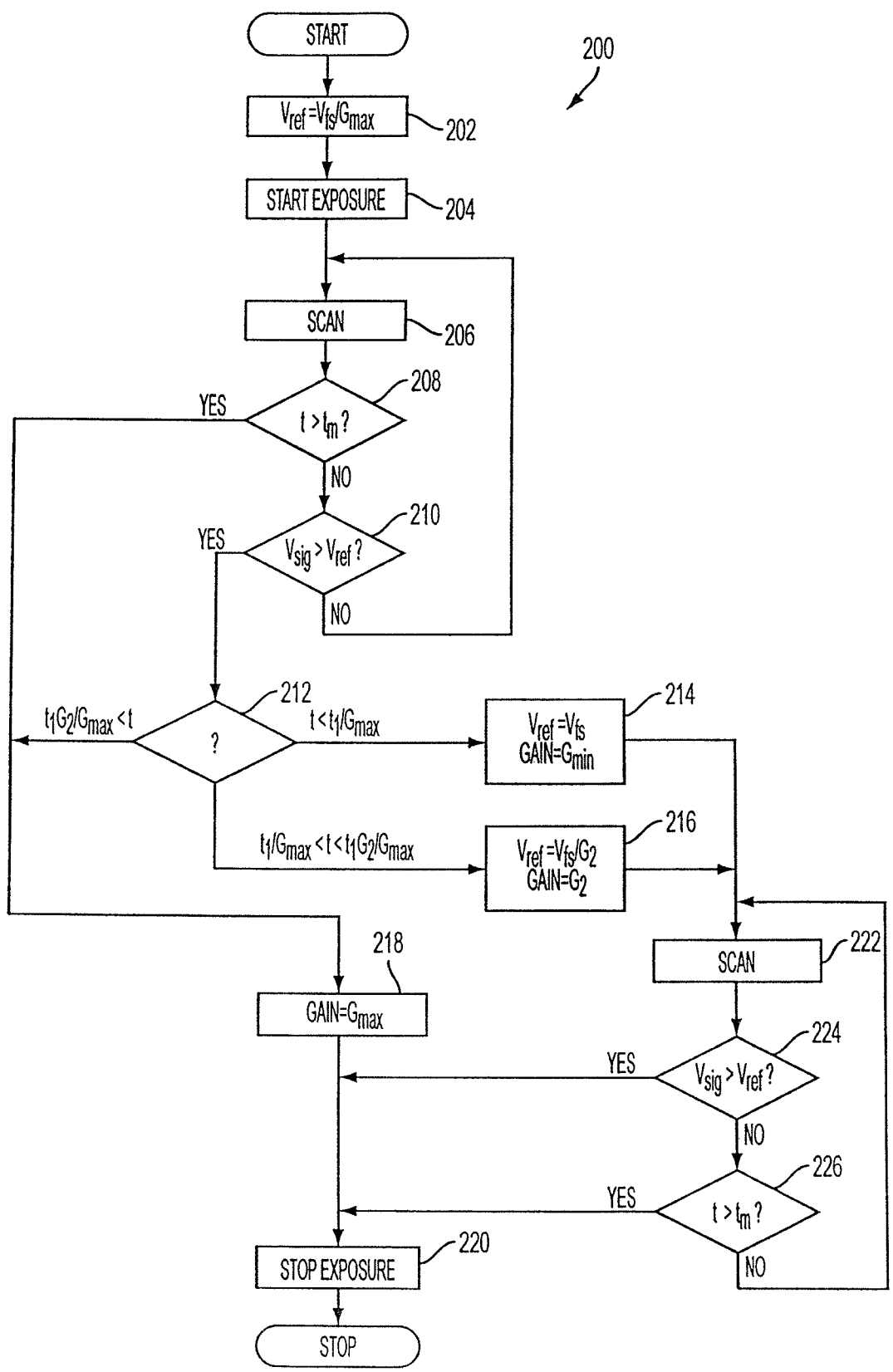
FIG. 3 illustrates in flowchart form an exemplary method of performing automatic light control in accordance with an embodiment of the invention.

The illustrated imager 110 also performs automatic light control according to an embodiment of the invention. FIG. 3 illustrates an exemplary method 200 of performing automatic light control in accordance with an embodiment of the invention. The method 200 has some desirable requirements that enable it to achieve automatic light control in a quick, efficient, real-time and non-destructive manner.

For example, method 200 uses a measurement time that is part of and no greater than the total exposure time. Keeping the measurement time within the boundaries of the total exposure helps conserve power. Another desirable requirement is that the measurements taken during execution of method 200 are performed on a subset of pixels, rather than the entire array. The measurements are non-destructive, which means that the pixels are not reset during the exposure.

The method 200 seeks to obtain a predefined number of pixels having a predefined signal level (discussed in more detail below). To ensure a fast light control process, method 200 uses analog pixel signals rather than using analog-to-digital converted pixel signals. The method 200 will not include pixels having "white spots" (i.e., pixels with defects or extremely high dark current) in its final light control determination. The method 200 uses programmable (i.e., adjustable parameters) such as e.g., the analog gain required during pixel readout, required number of pixels at the predefined signal level ("$P_r$"), preferred exposure time ("$t_1$") and maximum exposure time ("$t_m$"). "Exposure time" is the time the light source is illuminated.

As will become apparent, method 200 continuously scans the predefined pixels during the exposure period. Decisions on the readout gain and exposure time settings are made based on the time intervals when the required number of pixels $P_r$ reach the reference level $V_{ref}$ (if they reach the level at all). Adjustments to certain parameters, including the reference level $V_{ref}$, maximum exposure time $t_m$ and gain, may be made during the exposure period.

Before execution of method 200 begins, the required number of pixels at the predefined signal level $P_r$ must be set. In addition, the preferred exposure time $t_1$ and maximum exposure time $t_m$ must also be set. The values for the required number of pixels $P_r$, preferred exposure time $t_1$ and maximum exposure time $t_m$ are application specific and the invention is not to be limited to any specific values for these parameters. The maximum exposure time $t_m$ limits the exposure duration to prevent blurring of the images. As will become apparent, the timing values used to determine changes in the reference level ($V_{ref}$) and gain are determined based on the preferred exposure time $t_1$.

Execution of method 200 begins by setting the reference level $V_{ref}$ (step 202). In a desired embodiment, $V_{ref}$ is set to $V_{fs}/G_{max}$, where $V_{fs}$ is the full scale signal and $G_{max}$ is the maximum gain that can be used. An exemplary value for $V_{fs}$ is 1V and an exemplary value for $G_{max}$ is 4. Once the reference level $V_{ref}$ is set, the exposure is started and the current exposure time t is set to 0 (step 204). It should be noted that how the exposure is started is application specific. For example, in a swallowable pill application, or any application with its own light source, the exposure is started by turning on the light source. For other applications where the light is continuous, the exposure period is the integration period. As such, the start of the exposure period is the start of the integration period (which could be activated by a shutter or some other method known in the art).

All of the predefined pixels are scanned (step 206) during an exposure (or integration period). The pixel signals $V_{sig}$ from all the predefined scanned pixels are sent via a respective column line to a respective comparator. Once all of the pixels are scanned, the present time t is compared to the maximum exposure time $t_m$ (step 208). If the present time t is greater than the maximum exposure time $t_m$, the method continues at step 218 where the gain is set to maximum gain $G_{max}$. The exposure is stopped (i.e., the digital block 166 of FIG. 2 outputs the illumination stop signal ILLUMINATION STOP to turn off the illumination devices or to end the integration period, depending upon the application)(step 220) and the method 200 ends.

Figure 4:
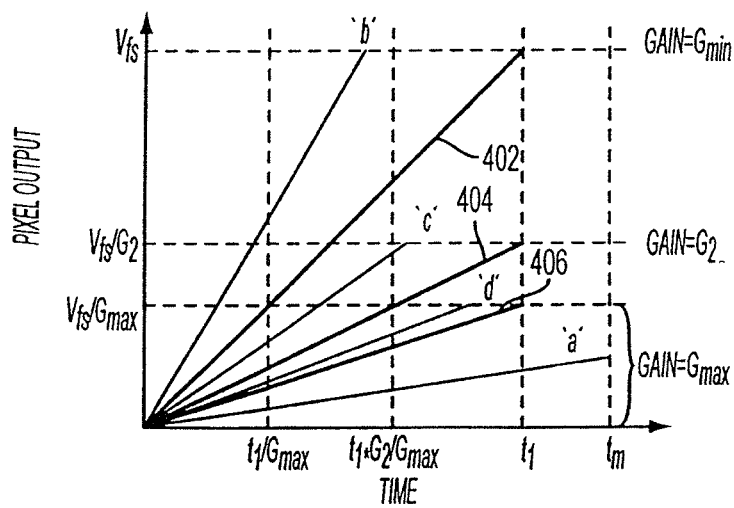
FIG. 4 illustrates a graph of gain settings and pixel output levels versus time according to an operation of the invention.

The new gain setting is reflected as line 'a' in FIG. 4, which is a graph of gain settings and pixel output level versus time. In FIG. 4, solid lines 402, 404 and 406 reflect respective gain limits for the various pixel output versus time combinations. Specifically, line 402 reflects the gain limit set to the minimum gain $G_{min}$, line 404 represents the gain limit $G_2$ (a gain halfway between the maximum and minimum) and line 406 reflects the gain limit set to the minimum gain $G_{max}$.

Referring again to FIG. 3, if at step 208 the present time t is not greater than the maximum exposure time $t_m$, the method continues at step 210 where, for each predefined pixel, each comparator determines if the pixel signal $V_{sig}$ is greater than the reference level $V_{ref}$. If a required number of pixels $P_r$ of the predefined number of pixels do not have a pixel signal $V_{sig}$ that is greater than the reference level $V_{ref}$ (step 210), the method 200 continues at step 206 where all of the predefined pixels are scanned once again.

If the required number of pixels $P_r$ of the predefined number of pixels have a pixel signal $V_{sig}$ that is greater than the reference level $V_{ref}$ (step 210) the method 200 continues at step 212 to determine the appropriate light control action.

If the present time t is less than $t_1/G_{max}$, the readout gain is set to the minimum gain $G_{min}$ and the reference level $V_{ref}$ is set to $V_{fs}$ (step 214). The new gain setting is reflected as line 'b' in FIG. 4. The exposure is allowed to continue. As such, the method 200 continues at step 222 where all of the predefined pixels are scanned again. At step 224 it is determined, for each predefined pixel, if the pixel signal $V_{sig}$ is greater than the new reference level $V_{ref}$. If a required number of pixels $P_r$ of the predefined number of pixels do not have a pixel signal $V_{sig}$ that is greater than the reference level $V_{ref}$ (step 224), the method 200 continues at step 226 to determine if the present time t is greater than the maximum exposure time $t_m$.

If it is determined that the present time t is not greater than the maximum exposure time $t_m$, the method 200 continues at step 222. If it is determined that the present time t is greater than the maximum exposure time $t_m$ (step 226) or that required number of pixels $P_r$ have a pixel signal $V_{sig}$ that is greater than the reference level $V_{ref}$ (step 224), the exposure is stopped (step 220) and the method 200 terminates.

If at step 212 it is determined that $t_1/G_{max} < t < t_1 G_2/G_{max}$, the readout gain is set to $G_2$ (i.e., the gain halfway between the maximum and minimum gains), the reference level $V_{ref}$ is set to $V_{fs}/G_2$ (step 216), and the exposure is allowed to continue. As such, the method 200 continues at step 222 where all of the predefined pixels are scanned again (as discussed above). The new gain setting is reflected as line 'c' in FIG. 4.

If at step 212 it is determined that $t_1 G_2/G_{max} < t$, the readout gain is set to the maximum gain $G_{max}$ (step 218) and the exposure is stopped (step 220). The new gain setting is reflected as line 'd' in FIG. 4.

Thus, the illumination on the pixels is monitored in real-time, with adjustments to exposure time duration and readout gain (if necessary). Present illumination on the pixels is determined in a non-destructive manner. That is, the signal level of the pixels is not altered or effected in any manner so that the eventual digital image reflects the image captured by the pixels. The method 200 conserves power by only utilizing the light source during the exposure period (as opposed to illuminating the light source prior to and longer than the exposure period).

In method 200, the rows are scanned sequentially, but the invention is not so limited. The columns are checked in parallel by comparing the pixel signals to the reference level in the comparators 160 (FIG. 2).

For CMOS image sensors, the pixel is typically reset before the exposure. As such, the pixel signal output level $V_{out}$ begins at the reset voltage $V_{rst}$. When exposed to light, the pixel output signal level (in absolute voltage) gradually drops toward a ground potential during the integration/exposure period. Thus, the pixel signal $V_{sig}$ is usually defined as $V_{sig} = V_{rst} - V_{out}$. The defined threshold level $V_{th}$ is usually defined as $V_{th} = V_{rst} - V_{pix-th}$, where $V_{pix-th}$ is the pixel threshold referred to ground.

The reference voltage presented to the comparators is the voltage (referred to ground) that represents the pixel output voltage $V_{pix-th}$ th (referred to ground) at the desired signal level $V_{th}$ (referred to reset level). $V_{sig}$ is $V_{rst}$ minus the pixel output level at any time, thus $V_{th} = V_{rst} - V_{pix-th}$. During processing, the reference level $V_{ref}$ is $V_{fs}$/gain, ideally referenced against $V_{rst}$. $V_{rst}$, however, is not available during the exposure. As such, an average reset level $V_{rst,mean}$ is used during the exposure period. $V_{rst,mean}$ is the average reset level from a set of dark (i.e., light shielded) pixels outside or at the border of the image area. The pixel signal level is given as the difference between the pixel reset level and the instantaneous pixel output voltage, and will this be a positive voltage increasing from 0 during exposure.

During method 200, the results of the first scan of the predetermined pixels (which in the illustrated embodiment is 640 pixels) is used as a check for "white spots." These pixels are not allowed to contribute to the light control determinations effecting gain and exposure time settings. The method 200 may be modified to scan additional pixels to compensate for the "white spot" pixels. In addition, method 200 may include the option to check for a predetermined number of saturated pixels after each scanned line, or at other intervals based on selected rows, to terminate the scan before it completes. This option increases the exposure time resolution.

Figure 5:
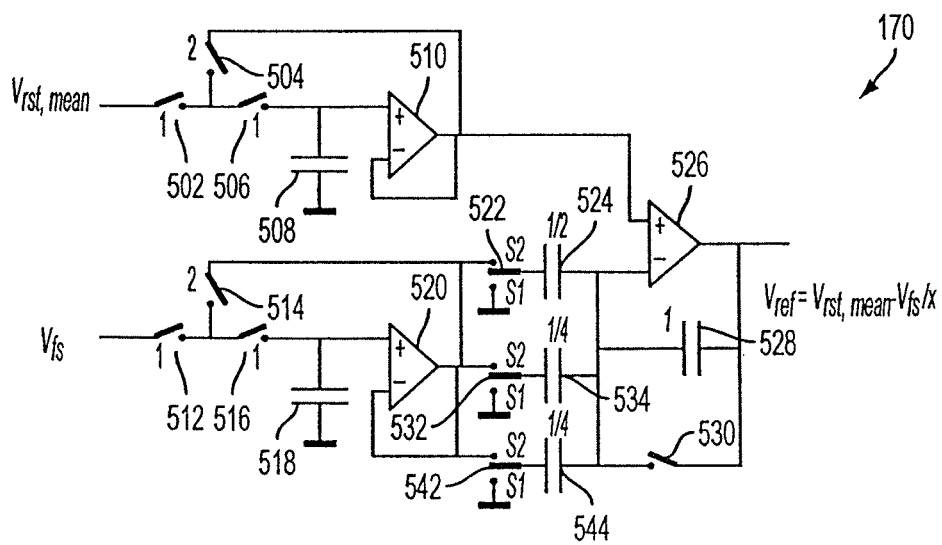
FIG. 5 illustrates in schematic form an exemplary embodiment of a voltage reference generator according to the invention.

The supply voltage in the exposure period may be different from the supply voltage during pixel readout. This means that the pixel reset level may not be correct during exposure. The voltage reference generator 170 according to the invention (FIG. 5) compensates for this. The generator 170 includes several sample and hold switches 502, 504, 506, 512, 514, 516, capacitors 508, 518, 524, 528, 534, 544, three amplifiers 510, 520, 526 and additional switches S1, S2.

In the illustrated generator 170, a mean reset value $V_{rst,mean}$ from a set of dummy pixels is sampled and stored on capacitor 508 just before the light is illuminated (or the integration period begins). A low droop rate is required as the reset level $V_{rst,mean}$ must be valid throughout the complete light control method 200. To reduce leakage, the sampled value $V_{rst,mean}$ is buffered in amplifier 510 and feedback to the switch 506 terminal and to the first sampling capacitor 508. The full scale level $V_{fs}$ is sampled from a supply voltage source in an identical manner and a switched capacitor circuit (i.e., capacitors 524, 534, 544 and switches S1, S2) generates the reference $V_{ref}$ sent to the comparators. That is, $V_{ref}=V_{rst,mean}-V_{fs}/x$, where x=gain.

In the illustrated embodiment of the generator 170, the generation of the reference $V_{ref}$ is done by subtraction of the predefined fraction of the full scale signal $V_{fs}$ from the average reset level $V_{rst,mean}$. It should be noted that the generation of the reference $V_{ref}$ may be based on addition or multiplication of currents and the invention is not to be limited to the subtraction technique illustrated in FIG. 5. $V_{fs}$ is divided by the readout gains 1, 2, or 4 according to the position of the switches S1, S2. The value is buffered by the third amplifier 566, which has its reference terminal connected to the $V_{rst,mean}$ signal. Then, $V_{fs}/x$, where x=gain, becomes relative to $V_{rst,mean}$ and the output becomes $V_{rst,mean}-V_{fs}/x$ relative to ground, which is desirable.

Figure 6:
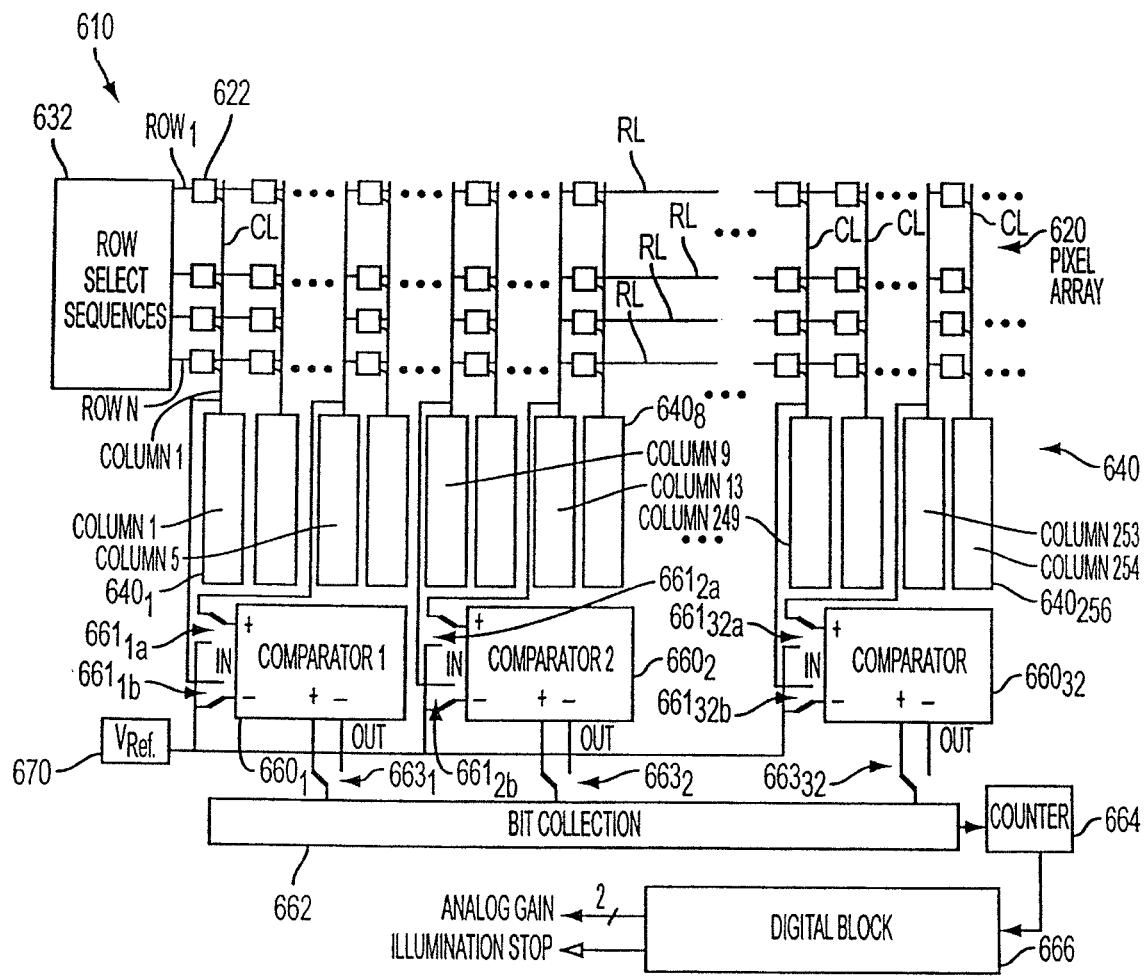
FIG. 6 illustrates another exemplary imager constructed in accordance with another embodiment of the invention.

FIG. 6 illustrates another exemplary imager 610 constructed in accordance with another exemplary embodiment of the invention. The illustrated imager 610 compensates for comparator input offsets, which may be present in the imager 110 illustrated in FIG. 2. The illustrated imager 610 uses half the number of comparators $660_1$, $660_2$, ..., $660_{32}$ that are used in the FIG. 2 imager 110. The illustrated imager 610 compares columns in two consecutive phases. In phase one, the outputs from the first half of the columns (e.g., column 1, column 9, ..., column 249) are input into the comparators $660_1$, $660_2$, ..., $660_{32}$ via input switches $661_{1a}$, $661_{2a}$, ..., $661_{32a}$ and tested against the reference level $V_{ref}$ via input switches $661_{1b}$, $661_{2b}$, ..., $661_{32b}$. The results are output from the comparators $660_1$, $660_2$, ..., $660_{32}$ to the bit collection unit 662 via switch $663_1$, $663_2$, ..., $663_{32}$. In the second phase, the outputs from the second half of the columns (e.g., column 5, column 13, ..., column 253) are input into the comparators $660_1$, $660_2$, ..., $660_{32}$ via input switches $661_{1b}$, $661_{2b}$, ..., $661_{32b}$ and tested against the reference level $V_{ref}$ via input switches $661_{1a}$, $661_{2a}$, ..., $661_{32a}$. The results are output from an inverted output of the comparators $660_1$, $660_2$, ..., $660_{32}$ to the bit collection unit 662 via switches $663_1$, $663_2$, ..., $663_{32}$.

Using swapped input and output terminals of the comparators $660_1$, $660_2$, ..., $660_{32}$, potential offsets are substantially removed from the light control process. This improves the accuracy of the light control process of the invention.

Figure 7:
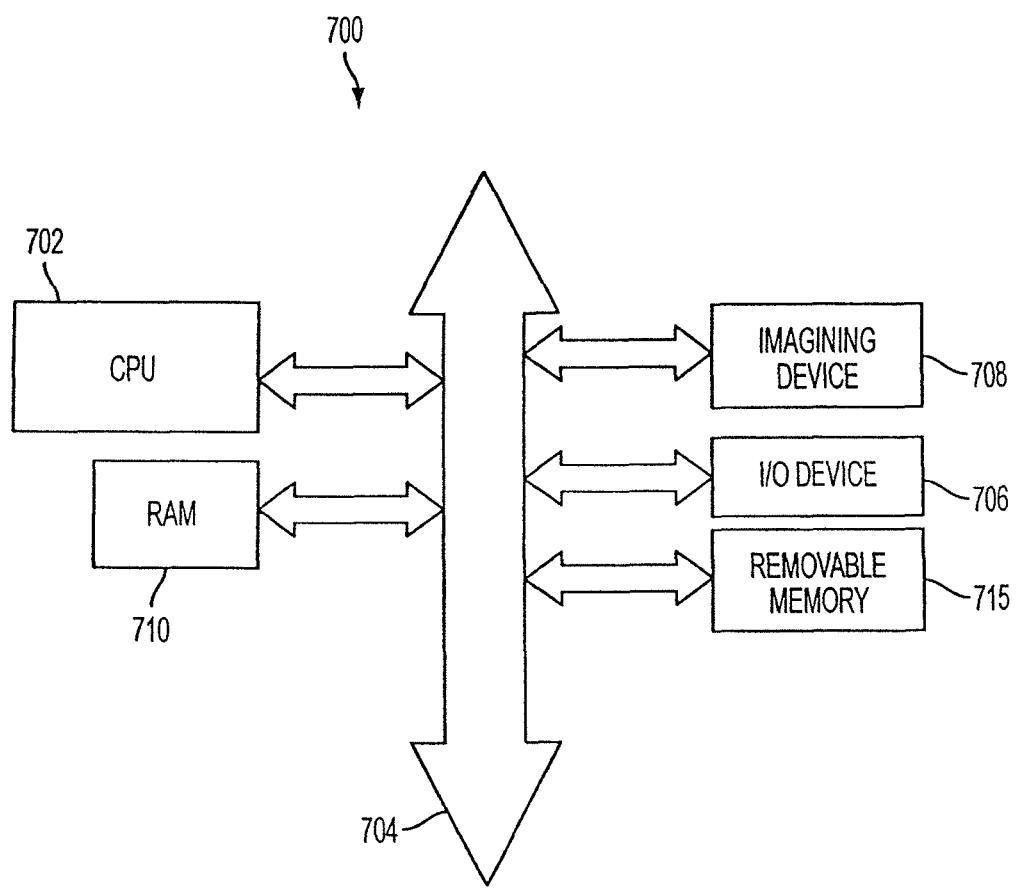
FIG. 7 shows a processor system incorporating at least one imaging device constructed in accordance with an embodiment of the invention.

FIG. 7 shows system 700, a typical processor system modified to include an imaging device 708 constructed in accordance with an embodiment of the invention (i.e., imager 110 of FIG. 2, imager 610 of FIG. 6). The processor-based system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 700, for example a camera system, generally comprises a central processing unit (CPU) 702, such as a microprocessor, that communicates with an input/output (I/O) device 706 over a bus 704. Imaging device 708 also communicates with the CPU 702 over the bus 704. The processor-based system 700 also includes random access memory (RAM) 710, and can include removable memory 715, such as flash memory, which also communicate with the CPU 702 over the bus 704. The imaging device 708 may be combined with a processor, such as a CPU, digital signal processor, or microprocessor, with or without memory storage on a single integrated circuit or on a different chip than the processor.

Figure 8:
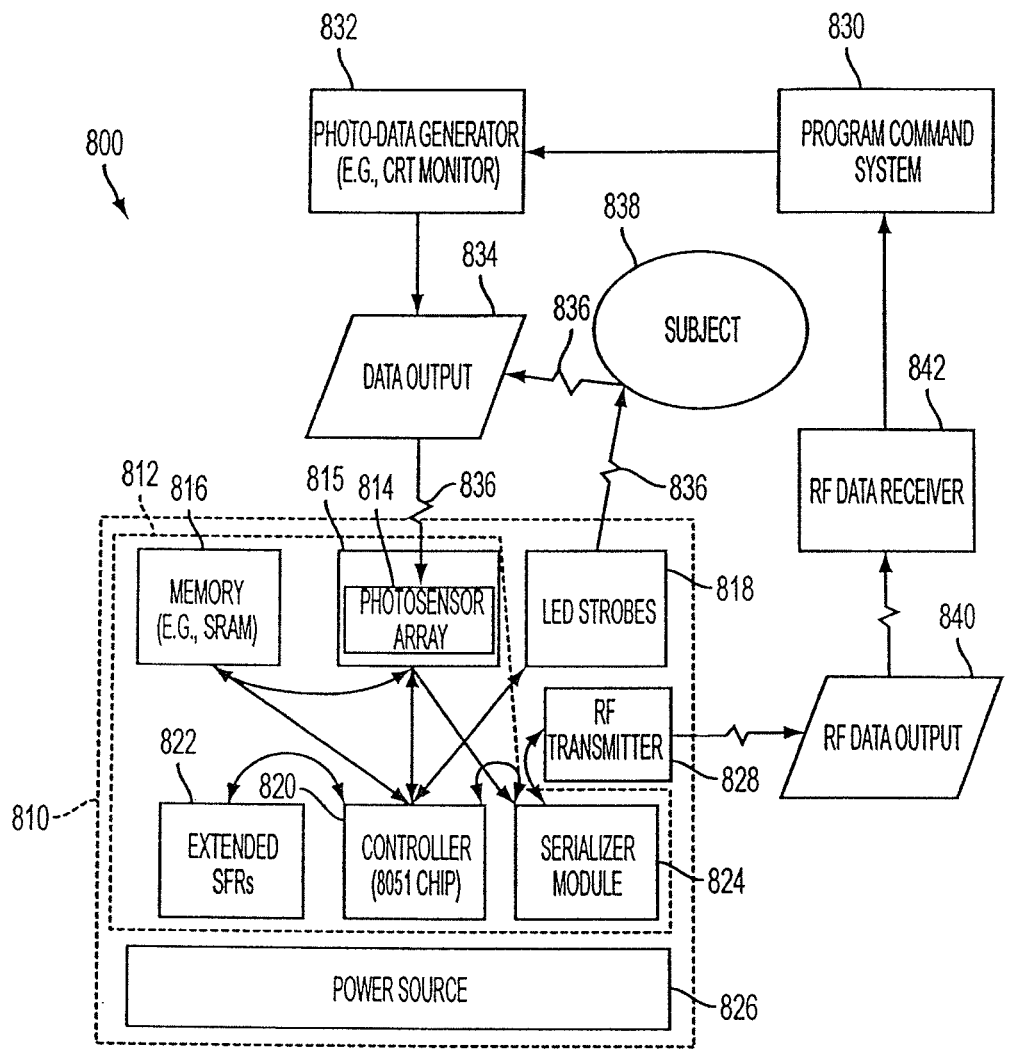
FIG. 8 shows another exemplary system incorporating at least one imaging device constructed in accordance with another embodiment of the invention.

FIG. 8 shows another exemplary system 800 having a device 810 incorporating an imager chip 812 constructed in accordance with an embodiment of the invention (i.e., imager 110 of FIG. 2, imager 610 of FIG. 6). The imager chip 812 can include a photosensor array 814, photosensor interface 815, memory circuit 816, and a controller 820 integrated on the same silicon chip. The photosensor interface 815 can be controlled by the controller 820 for addressing the array 814. The system 800 is constructed and operated as described in U.S. Pat. No. 7,187,049.

The memory circuit 816 can communicate with the other operational circuits of the device 810, including, but not limited to, the controller 820 (e.g., an 8051 controller), a serializer module 824, extended shift registers SFRs 822, and an RF (radio frequency) transmitter 828. The memory circuit 816 is capable of storing operational information for the photosensor array 814 and all other circuitry incorporated into the device 810. Further, the memory circuit 816 is be capable of storing images received by the photosensor array 814. The controller 820 operates as the "brain" of the device 810 using programming and/or data stored in the memory circuit 816, and/or in an internal ROM. The controller 820 can utilize the stored programs and/or data in controlling the acquiring of images, the storing of images, and the communication of images to an external system for viewing.

The CMOS photosensor array 814 can download captured images, like a camera. However, the CMOS photosensor array 814 of the invention can also download programming and/or operational information as data-input 834, such as software, programming, or other useful data. A user can select the data desired to be downloaded by utilizing a program command system 830, which can contain a collection of programs, instructions, software, or other data that can be utilized by the device 810. The program command system 830, which can be a standard computer, communicates to a photo-data generator 832, which can be any device capable of outputting light signals, for instance, a computer monitor (CRT) connected to a computer, or an LED unit. Preferably, the photo-data generator 832 can output light at various wavelengths (colors) and intensities, and in various patterns.

The photo-data generator 832 generates light 836, which is input to photosensor array 814 during a period when it is not acquiring images. This period can be controlled and designated by the controller 820. The light 836 can be varied in any means known in the art so that it corresponds to the data desired to be downloaded into the device 810. As an example, the light can be varied in color, where different colors or color patterns can be read by the photosensor array 814, stored in the memory circuit 16, and interpreted by the controller 820 of the device 810, via communication with the photosensor array 814, as different digital information (i.e., "1s" and "0s"). In this way, the memory circuit 814, and device 810 in general, can be programmed by a user with the input of light 836 to the photosensor array 814.

The device 810 functions as an imager camera. The camera function of the device 810 is like that of any other CMOS imager camera to acquire still frames or constant motion video. If necessary, the LED(s) 818 can function as light strobes during camera use, and be synchronized with the image acquisition by the photosensor array 814. Light 836 from the LED 818 can illuminate a subject 838 within an image area to be captured. The reflected light 836 from the illuminated subject 838 can be acquired by the photosensor array 814. The images acquired by the photosensor array 814 are communicated to and translated by the serializer module 824 into a format for image output.

The memory circuit 816 can store programming and/or data so that the controller 820 can use the input programs and/or data acquired during the data input operation to direct the operation of the photosensor array 814, the serializer module 824, and the extended SFRs 822 (all of which can be in communication with the memory circuit 816 and controller 820) for image capture, storage, processing, and output.

At a desired time, or on an ongoing basis, the stored images can be translated into an RF data output 840 generated by an RF transmitter 828 in communication with the serializer module 824 under control of the controller 820. The images, as RF data output 840, are transmitted to an RF data receiver 842. The RF data receiver 842 is in communication with the program command system 830 so that a user can receive the images acquired by the photosensor array 814 for viewing, for example on the same computer monitor (i.e., photo-data generator 832) that could be used to initially program the device 810. In one desired embodiment, the device 810 is incorporated into a swallowable pill as described in U.S. Pat. No. 7,187,049.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An image sensor comprising:
   an array of pixels comprising a plurality of rows and columns;
   a plurality of comparison circuits, each comparison circuit receiving a reference signal value and being coupled to a respective column, each comparison circuit comparing a pixel signal value to the reference signal value and having an output that indicates if the pixel signal value is greater than the reference signal value;
   a first circuit connected to and counting a number of outputs from the comparison circuits that indicate the pixel signal value is greater than the reference signal value, said first circuit outputting the number of outputs; and
   a logic circuit that receives the number of outputs from the first circuit, wherein during an exposure period said logic circuit compares the number received from the first circuit to a predetermined number of pixels that may have a pixel signal value greater than the reference signal value and, if the number received from the first circuit is greater than the predetermined number of pixels and a current exposure time is less than a maximum exposure time, the logic circuit adjusts automatic exposure control parameters for a remaining portion of the exposure period by setting a readout gain of the image sensor to a minimum gain value and adjusting the reference signal value to a value of a full scale pixel signal.

2. The image sensor of claim 1, wherein said first circuit comprises:
   a collection circuit connected to receive the outputs from all of the comparison cicuits; and
   a counter connected to the collection circuit, said counter counting the results from the connection circuit and generating the number of outputs.

3. The image sensor of claim 1, further comprising a reference generator for generating and outputting the reference signal value to the comparison circuits.

4. The image sensor of claim 3, wherein said reference generator generates the reference signal value based on a mean reset value.

5. The image sensor of claim 3, further comprising:
   a plurality of first switches, each first switch having a first state connecting a first input of a respective comparison circuit to a pixel signal from a respective column, each switch having a second state connecting the first input of the respective comparison circuit to the reference signal, each comparison circuit having a first output for outputting a comparison result based on the first input;
   a plurality of second switches, each second switch having a first state connecting a second input of a respective comparison circuit to the reference signal, each switch having a second state connecting the second input of the respective comparison circuit to a pixel signal from a respective column, each comparison circuit having a second output for outputting a comparison result based on the second input; and
   a plurality of third switches for outputting the first output from the comparison circuits to the first circuit in a first state, and for outputting the second output from the comparison circuits to the first circuit in a second state.

6. A swallowable pill comprising:
   an image sensor, said image sensor comprising:
   an array of pixels comprising a plurality of rows and columns;
   a plurality of comparison circuits, each comparison circuit receiving a reference signal value and being coupled to a respective column, each comparison circuit comparing a pixel signal value to the reference signal value and having an output that indicates if the pixel signal value is greater than the reference signal value;
   a first circuit connected to and counting a number of outputs from the comparison circuits that indicate the pixel signal value is greater than the reference signal value, said first circuit outputting the number of outputs; and
   a logic circuit that receives the number of outputs from the first circuit , wherein during an exposure period said logic circuit compares the number received from the first circuit to a predetermined number of pixels that may have a pixel signal value greater than the reference signal value and, if the number received from the first circuit is greater than the predetermined number of pixels and a current exposure time is less than a maximum exposure time, the logic circuit adjusts automatic exposure control parameters for a remaining portion of the exposure period by setting a readout gain of the image sensor to a minimum gain value and adjusting the reference signal value to a value of a full scale pixel signal.

7. An image sensor comprising:
an array of pixels comprising a plurality of rows and columns;
a plurality of comparison circuits, each comparison circuit receiving a reference signal value and being coupled to a respective column, each comparison circuit comparing a pixel signal value to the reference signal value and having an output that indicates if the pixel signal value is greater than the reference signal value;
a first circuit connected to and counting a number of outputs from the comparison circuits that indicate the pixel signal value is greater than the reference signal value, said first circuit outputting the number of outputs; and
a logic circuit that receives the number of outputs from the first circuit, wherein during an exposure period said logic circuit compares the number received from the first circuit to a predetermined number of pixels that may have a pixel signal value greater than the reference signal value and, if the number received from the first circuit is greater than the predetermined number of pixels and a current exposure time is within a predetermined time interval, the logic circuit adjusts automatic exposure control parameters for a remaining portion of the exposure period by setting a readout gain to a gain value between a maximum gain value and a minimum gain value and setting the reference signal value to a value of a full scale pixel signal divided by the readout gain value set to be between the maximum gain and the minimum gain value.

8. The image sensor of claim 7, wherein said first circuit comprises:
a collection circuit connected to receive the outputs from all of the comparison circuits; and
a counter connected to the collection circuit, said counter counting the results from the connection circuit and generating the number of outputs.

9. The image sensor of claim 7, further comprising a reference generator for generating and outputting the reference signal value to the comparison circuits.

10. The image sensor of claim 9, wherein said reference generator generates the reference signal value based on a mean reset value.

11. The image sensor of claim 9, further comprising:
a plurality of first switches, each first switch having a first state connecting a first input of a respective comparison circuit to a pixel signal from a respective column, each switch having a second state connecting the first input of the respective comparison circuit to the reference signal, each comparison circuit having a first output for outputting a comparison result based on the first input;
a plurality of second switches, each second switch having a first state connecting a second input of a respective comparison circuit to the reference signal, each switch having a second state connecting the second input of the respective comparison circuit to a pixel signal from a respective column, each comparison circuit having a second output for outputting a comparison result based on the second input; and
a plurality of third switches for outputting the first output from the comparison circuits to the first circuit in a first state, and for outputting the second output from the comparators to the first circuit in a second state.

12. A swallowable pill comprising:
an image sensor, said image sensor comprising:
an array of pixels comprising a plurality of rows and columns;
a plurality of comparison circuits, each comparison circuit receiving a reference signal value and being coupled to a respective column, each comparison circuit comparing a pixel signal value to the reference signal value and having an output that indicates if the pixel signal value is greater than the reference signal value;
a first circuit connected to and counting a number of outputs from the comparison circuits that indicate the pixel signal value is greater than the reference signal value, said first circuit outputting the number of outputs; and
a logic circuit that receives the number of outputs from the first circuit, wherein during an exposure period said logic circuit compares the number received from the first circuit to a predetermined number of pixels that may have a pixel signal value greater than the reference signal value and, if the number received from the first circuit is greater than the predetermined number of pixels and a current exposure time is within a predetermined time interval, the logic circuit adjusts automatic exposure control parameters for a remaining portion of the exposure period by setting a readout gain to a gain value between a maximum gain value and a minimum gain value and setting the reference signal value to a value of a full scale pixel signal divided by the readout gain value set to be between the maximum gain and the minimum gain value.

* * * * *

UNITED STATES PATENT AND TRADEMARK OFFICE
CERTIFICATE OF CORRECTION

PATENT NO.       : 8,547,476 B2                                        Page 1 of 1
APPLICATION NO.  : 13/403599
DATED            : October 1, 2013
INVENTOR(S)      : Alf Olsen et al.

It is certified that error appears in the above-identified patent and that said Letters Patent is hereby corrected as shown below:

On the title page, Item (56), under "Other Publications", column 2, line 2, delete "Encoscopy" and insert -- Endoscopy --, therefor.

In the Claims

In column 10, line 11, in Claim 2, delete "cicuits;" and insert -- circuits; --, therefor.

In column 10, line 58, in Claim 6, delete "circuit ," and insert -- circuit, --, therefor.

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,547,476 B2           Page 1 of 1
APPLICATION NO.   : 13/403599
DATED             : October 1, 2013
INVENTOR(S)       : Alf Olsen et al.

It is certified that error appears in the above-identified patent and that said Letters Patent is hereby corrected as shown below:

On the title page item (73), should read:

Assignees: Micron Technology, Inc., Boise, ID (US), and
           Given Imaging Ltd., Yoqneam, Israel Signed and Sealed this
Tenth Day of March, 2015

Michelle K. Lee
*Deputy Director of the United States Patent and Trademark Office*